United States Patent [19]
Johnson et al.

[11] 3,709,520
[45] Jan. 9, 1973

[54] VEHICLE WEIGHT MOUNTING MEANS

[75] Inventors: Wayne E. Johnson, Milwaukee; Eugene V. Korb, West Allis, both of Wis.

[73] Assignee: Allis-Chalmers Manufacturing Company, Milwaukee, Wis.

[22] Filed: Nov. 19, 1970

[21] Appl. No.: 91,079

[52] U.S. Cl. .............................................280/150 E
[51] Int. Cl................................................B60r 27/00
[58] Field of Search....280/150 E; 248/316 D, 316 R, 248/226, 316 C, 316 A

[56] References Cited

UNITED STATES PATENTS 3,492,019   1/1970   Folkerts..........................280/150 E

*Primary Examiner*—Benjamin Hersh
*Assistant Examiner*—Robert R. Song
*Attorney*—Arthur L. Nelson, Kenneth C. McKivett and Robert B. Benson

[57] ABSTRACT

A vehicle front end weight mounting means for stabilizing the front end of a vehicle and to provide positive traction for steering.

10 Claims, 5 Drawing Figures

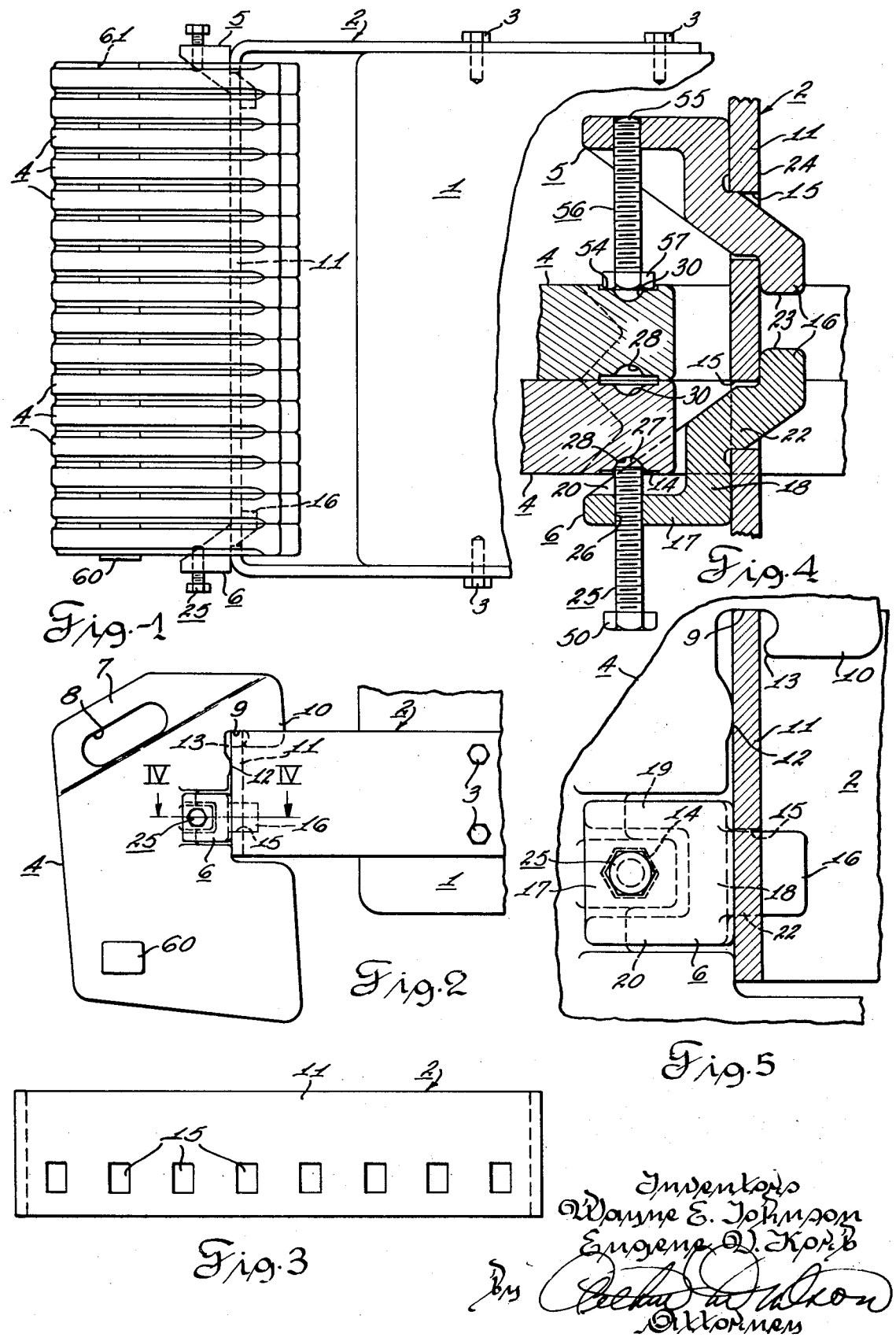

VEHICLE WEIGHT MOUNTING MEANS

This invention relates to the front end weighting of a vehicle for stabilizing and assuring traction of the vehicle front wheels and more particularly to means for firmly mounting one or more weights on the front end of the vehicle to provide stabilization and traction to maintain steering control of the vehicle.

In the past, tractors were relatively heavy with reference to the engine power output as compared to the present day tractor. The average modern tractor requires a certain amount of added weight or ballast to provide traction for the wheels to pull the draft load. The addition of large amounts of built in weight can be expensive, however, liquid ballast in the rear wheel tires economically provides the added weight necessary for traction.

A hydraulic weight distribution system on tractors used during such operations as plowing raises other problems. The weight distribution system operates by sensing a draft load and distributing the weight of the tractor and the implement on the rear wheels with an increased draft load and accordingly does provide added traction needed. This, however, has the disadvantage of reducing the weight on the front wheels and in some instances reducing it so much that instability of the tractor is created where the front end of the tractor lifts off the ground and the operator has no control of the tractor for steering.

Accordingly, this invention is to provide a means for applying weights to the front end of the vehicle. The weights are readily attached or removed from the hanger on the front end of the vehicle and any number of weights from a single weight to a full complement on the hanger can be attached on the vehicle. A maximum number of weights can be used where heavy traction is needed and it is desirable to weight down the front end. The weights are hung in front of the front wheels which provides a good leverage to counteract the tendency of lifting the front end when the weight is transferred to the rear wheels. Accordingly, this invention provides a means whereby weights can be attached or removed to suit the particular operation of the vehicle.

Accordingly, it is an object of this invention to provide front end weights and means for attaching singularly the weights on a hanger on the front end of the vehicle.

It is another object of this invention to provide front end weights which may be attached singularly or in any number up to a full complement to provide massive weighting forward of the front wheels.

It is a further object of this invention to provide a front end hanger connected to the front end of the vehicle with a bracket to selectively attach a single or a plurality of weights in a fixed and firmly attached position on the hanger to accommodate the draft load requirements and yet maintain the maneuverability necessary for the various types of operation of the vehicle.

The objects of this invention are accomplished by mounting a hanger having a transverse bar extending across the front of the tractor with holes spaced over the length of the bar. A plurality of weights are selectively mounted on the hanger bar. Each weight is provided with a hook which hangs over the bar while a portion of the brackets are received in holes in the bar with fastening means which firmly locks the weight with the bar to thereby provide a means for selectively increasing the weight on the front end of the tractor to accommodate any draft load required of the tractor.

Referring to the drawing, the preferred embodiment of this invention is illustrated.

FIG. 1 is a fragmentary plan view of the hanger and the front end weights.

FIG. 2 is a side view of the hanger and the front end weights.

FIG. 3 is a front view of the hanger showing the holes in the transverse bar.

FIG. 4 is a cross section view taken on line IV—IV of of FIG. 2.

FIG. 5 is an enlarged fragmentary view showing the side of the bracket, a portion of the weight, and a portion of the hanger for mounting the front end weight.

Referring to the drawings, FIG. 1 illustrates the chassis 1 supporting the hanger 2 by means of a plurality of bolts 3. The hanger 2 extends forwardly of the chassis 1 on the front end of the tractor and supports the plurality of weights 4 which are mounted in side by side relationship overhanging the hanger 2. A right-hand bracket 5 and a left-hand bracket 6 engage the outboard sides of the plurality of weights 4 and compress the weights firmly against each other.

Although a full complement of weights is shown in FIG. 1 a bracket 5 and 6 will singly mount any one weight 4 on the hanger 2.

Referring to FIG. 2 a weight 4 is formed with a handle 7 forming an opening 8 to permit the operator to grasp the weights and remove it from the hanger 2. The hanger 2 carries the weights on the surface 9 defined by the hooked portion 10. When the weight is positioned as shown, the center of gravity of the weight is forward of the crossbar 11 which causes the facing 12 to bear against crossbar 11.

The crossbar 11 of the hanger 2 is formed with a plurality of holes 15 spaced across the transverse length of the bar. A hole 15 receives a lug 16 on the left-hand bracket 6, another hole 15 receives a similar lug on the right-hand bracket 5. The left-hand bracket 6 is shown in FIG. 2, FIG. 5 and FIG. 4. The bracket 6 forms an L-shaped cross section having an arm 17 extending forwardly of the crossbar 11 and an arm 18 extending parallel with the crossbar 11. A pair of gussets 19 and 20 connect the two arms 17 and 18 to reinforce the bracket. The lug 16 has a connecting portion 22 intermediate the arm 18 and the end 23 of the lug 16. Intermediate portion 22 substantially fills the hole 15 as it extends through crossbar 11 and the lug engages a surface 24. The fullness of the intermediate portion 22 in the hole 15 substantially eliminates movement of the lug in the hole when the fastening screw 25 is tightened. The fastening screw 25 is received within the threaded opening 26 in the arm 17. The end 27 of the fastening screw is received within a recess 28 formed in the side of a weight 4. FIGS. 1 and 2 show a raised portion 60 on the side of each weight 4 for reception in a mating recessed portion 61 on the adjacent weight 4 to prevent relative sliding movement between weights.

FIG. 4 illustrates two weights positioned in side-by-side relationship for mountings similar to that illustrated in FIG. 1. It is also understood that a single weight can be mounted on the crossbar 11 by reversing the screw 25 causing the head 50 to engage the counterbore 14 of the weight 4 causing restraining lateral force from the bracket 6 preventing the hook from loosening from the crossbar.

Each of the weights 4 are formed with a recess 28 and 30 and counterbores 14 and 54 on their opposite sides to receive the fastening screws 25 or 56. The fastening screws 25 and 56 are screwed against the weight to firmly lock it on the crossbar 11 from either side.

The weight fastening device operates in the following manner. The hanger 2 is supported on the front end of the vehicle and forms a crossbar 11 which extends transversely in front of the chassis 1. The crossbar 11 defines plurality of holes 15 spaced across the length of the bar. The height of the bar is sufficient to prevent the weight from rotating around the bar once it is hung on its surface 9. The weight 4 is easily positioned on the bar by grasping the handle 7 and hanging the hook portion 10 over the top of the bar 11 and then permitting the gravitational force of the weight to cause the surface 12 to bear against the forward side of the bar. Since movement of the vehicle would cause the weight to swing about the pivoting point on the surface 9 of the bar 11, brackets 5 and 6 are used to lock the weight on the crossbar. A lug 16 is inserted through an opening 15 and engages the surface 24 and the weight is positioned to engage the side of the bracket 6. The fastening screw 25 is then screwed inwardly so that the end 27 engages the recess 28. Screw 56 in bracket 5 is shown reversed so that head 57 engages the counterbore 54 to produce a reaction force against screw 25 to lock the weights 4. If both screws 25 and 56 are in the reverse position, a single weight can be mounted on the hanger 2.

Any number of weights can be positioned and locked on the bar. Preferably, however, the brackets 5 and 6 are first positioned in the desired holes and in a predetermined spaced relation to each other to accommodate the number of weights to be positioned on the crossbar 11. When the number of weights desired are hung on the crossbar the fastening screws 25 and 56 are screwed in to engage the recesses 28 and 30 respectively. By screwing the fastening screws 25 and 56 in from opposing sides on the weights, the weights are compressed between the ends of the fastening screws 25 and 56 thereby locking the assembly on the front end of the hanger 2. The raised portion 60 and recessed portion 61 prevent sliding movement between the weights. By firmly locking the front end weights on the hanger 2 the weights are not subject to bouncing or rattling and cannot be removed from the hanger until the fastening screws 25 and 56 are again unscrewed from their fastening position in the bracket thereby releasing the compressive force on the opposing sides of the weights 4.

FIG. 1 shows a full complement of weights positioned on the front end of the vehicle. Although one weight can be positioned and fastened on the hanger 2 with the use of both brackets 5 and 6 three weights compressed between the fastening screws 25 and 56 permits use of the screws with the ends 27 and 55 to engage recesses 28 and 30 in the weights. In this position, a compressive force is exerted on both sides of the weights firmly locking them in position. Any number of weights can be added up to a full complement on the hanger as shown in FIG. 1.

The embodiments of the invention in which an exclusive property or privilege is claimed are defined as follows:

1. A front end weight assembly for use on a vehicle comprising, a hanger including a bar defining holes spaced along the length of said bar adapted for mounting on a vehicle chassis, at least one weight defining a hook carried on said hanger, recess means on at least one lateral surface of said weight, two brackets each having an end singularly locked in a separate hole of said holes in said bar and with one bracket on each side of said weight, fastening means on each one of said two brackets, said fastening means compressively engaging one of said recess means for biasing said weight transversely on said bar to thereby firmly lock said weight between opposing of said fastening means on said brackets in a fixed position on said bar.

2. A front end weight assembly for use on a vehicle as set forth in claim 1 wherein said weight defines said recess means on either side of said weight, each of said fastening means including a portion received in one of said recess means on said weight to thereby fasten said weight on said hanger.

3. A front end weight assembly for use on a vehicle as set forth in claim 2 wherein said fastening means includes a screw member engaging said recess means in said weight, said weight defines a transverse slot with said hook to receive said bar.

4. A front end weight assembly for use on a vehicle as set forth in claim 1 wherein each of said brackets define an L-shaped cross section including a lug element extending through one of said holes in said hanger.

5. A front end weight assembly for use on a vehicle as set forth in claim 1 wherein said assembly includes plurality of weights carried on said hanger, a first bracket received in a hole of said hanger and a second bracket received in a second hole of said hanger, said fastening means on each bracket includes a screw member with each screw member engaging said recess means on one of said weights on said hanger whereby said screw members compressively force said weights to laterally engage and lock in a fixed position on said hanger.

6. A front end weight assembly for use on a vehicle as set forth in claim 1 including a plurality of weights on said hanger, means on each of said weights defining said recess means on either side of said weight, a first bracket and a second bracket positioned each for reception within a separate mating hole on the right-hand and left-hand side of said hanger, a screw fastened in each of said brackets with the first screw singularly engaging one of said recess means on the right-hand side and the second screw engaging recess means on the left-hand side of said weights to thereby compressively position said weights on said hanger and firmly lock said weights to prevent movement and rattling.

7. A front end weight assembly for use on a vehicle as set forth in claim 5 including a raised portion on one side of said weight and a mating recessed portion on the opposite side of said weight with said raised portion being adapted for reception in the mating recessed portion of an adjacent weight to thereby prevent relative movement between said weights.

8. A front end weight assembly for use on a vehicle as set forth in claim 1 wherein each of said brackets defines an L-shaped cross section, at least one gusset connecting said L-shaped portion, a lug connected to said L-shaped portion for reception within a hole in said hanger to thereby lock said weight on said hanger.

9. A front end weight assembly for use on a vehicle as set forth in claim 1 wherein said bracket defines an L-shaped portion, said fastening means includes a screw fastener, a threaded opening in said bracket receiving said screw fastener for moving transversely to engage the recess means on the side of said weight to thereby lock said weight on said hanger.

10. A front end weight assembly for use on a vehicle as set forth in claim 1 wherein said bracket defines a lug defining a cross sectional area substantially equal to the cross sectional area of said hole in said bar for reception within said hole in said bar and substantially filling said hole thereby permitting limited movement of said bracket when said fastener engages said weight for locking of said weight on said hanger.

* * * * *